United States Patent
Becker et al.

[11] Patent Number: 6,062,654
[45] Date of Patent: May 16, 2000

[54] BRAKE CONTROL VALVE

[75] Inventors: Manfred Becker, Frankenthal; Dieter Gawlick, Ludwigshafen, both of Germany

[73] Assignee: Deere & Company, Moline, Ill.

[21] Appl. No.: 09/076,038

[22] Filed: May 8, 1998

[30] Foreign Application Priority Data

Jun. 6, 1997 [DE] Germany ............... 197 23 777

[51] Int. Cl.$^7$ .................. B60T 15/16; B60T 11/08; B60T 13/20; F15B 7/04
[52] U.S. Cl. ................. 303/13; 60/576; 60/550
[58] Field of Search ............ 303/11, 13, 114.1; 188/358, 359, 360; 60/576, 550, 547.1

[56] References Cited

U.S. PATENT DOCUMENTS

| | | |
|---|---|---|
| 3,163,007 | 12/1964 | Scott . |
| 3,754,793 | 8/1973 | Meyers ................ 303/13 |
| 4,703,978 | 11/1987 | Belart et al. ........... 60/547.1 |
| 4,741,161 | 5/1988 | Belart et al. ........... 60/576 |
| 4,753,074 | 6/1988 | Belart et al. ........... 303/114 |
| 4,807,942 | 2/1989 | Belart ................ 303/114 |
| 4,914,917 | 4/1990 | Schonlau ............. 60/547.1 |
| 4,963,692 | 10/1990 | Halabiya . |
| 5,221,126 | 6/1993 | Inoue ................ 303/13 |
| 5,273,348 | 12/1993 | Yagi et al. ............ 303/13 |
| 5,669,673 | 9/1997 | Reuter ............... 303/114.1 |

Primary Examiner—Robert J. Oberleitner
Assistant Examiner—Jeffrey Woller

[57] ABSTRACT

A vehicle brake control valve includes a piston assembly which is movable a stepped cylindrical bore of a valve housing in response to an actuating force against the force of a spring. The piston assembly includes port control edges which control communication between a brake pressure chamber which can be connected to the vehicle brakes, a reservoir, and a pump. Both the pump and the actuating force contribute to the brake pressure which builds up in the brake pressure chamber. The piston assembly includes an actuator piston and an annular piston that sealingly slides within a larger portion of the stepped bore. After the actuator piston moves a pre-set distance (H) it carries with it the annular piston. The annular piston, the actuator piston and a wall of the larger diameter portion of the stepped bore enclose a fill pressure chamber which is separated from the brake pressure chamber to achieve two-stage pressure build-up during manual braking (emergency braking) when the pump is inoperative. The fill pressure chamber and the brake pressure chamber are connected to each other via a pressure reducing valve which opens towards the brake pressure chamber.

23 Claims, 5 Drawing Sheets

BRAKE CONTROL VALVE

BACKGROUND OF THE INVENTION

This invention relates to a brake control valve for vehicle brakes.

U.S. Pat. No. 3,163,007 shows a brake valve with a piston which moves in a stepped cylindrical bore of a valve housing against the force of a spring. The piston includes port control lands which control communication between a brake pressure chamber connected to the vehicle brakes, a reservoir, and a pressure source, so that with the support of the pressure source, a brake pressure is developed in the brake pressure chamber which is a function of the actuating force applied to the piston. Furthermore, the brake control valve contains an annular piston which is sealed with respect to an enlarged section of the stepped cylindrical bore and which can be moved in the cylindrical bore by the piston after a pre-set stroke of the piston has been overcome.

This known brake valve also includes a control device which is sealed and is movable in a displacement chamber. At its forward end in the displacement chamber the control device encloses a pressure chamber. A pressure reservoir is formed by an annular groove formed in a rear end of the control device which is connected with a source of pressure. The pressure reservoir is bordered by a port control edge of the control device. When the control device is moved by a manually operated control rod against the force of a spring, then the port control edge opens a passage between the pressure reservoir and a connecting line which is connected to the pressure chamber and to the brake cylinders. Simultaneously, a connection between the pressure chamber and a reservoir is closed by a further port control edge. Furthermore, the brake control valve contains an annular piston which is movable in an enlarged section of the pressure chamber which is located at a distance ahead of the control device and that is sealed with respect to the displacement chamber. When the distance is overcome by movement of the control device, then a rubber seal fastened to the end face of the control device engages the annular piston so that it follows the further movement of the control device.

This known brake control valve is a mass-flow supported brake control valve that opens a flow of pressurized fluid from the pressure source to the brake cylinders and applies the brakes when a pre-set stroke of the control device is exceeded. Simultaneously, the pressurized fluid delivers a reaction force acting upon the control device which is proportional to the fluid pressure, which force opposes the actuating force applied to the control rod, which will be transmitted to the brake pedal and which thereby results in a very stiff brake system. This stiffness depends on the velocity of flow from the pressure source, but not on the elasticity of the power output, viscosity effects, etc. On one hand, the pressure chamber operates as a reaction force chamber, in which the reaction force is built up. On the other hand, if the pressure source fails, and as a result no reaction force is built up in the pressure chamber, then the pressure chamber operates as a displacement chamber, which delivers pressurized fluid to the brake cylinders when the control device is moved in a purely manual operation. Thereby emergency braking is possible even when the pressure source fails.

The operation of the known brake control valve is, however, not completely satisfactory during manual braking (emergency operation upon failure of the pressure source), since the same cross section is employed both for the filling of the brakes as well as for the build-up of the brake pressure itself. It is desirable that a larger cross section be effective during the filling than during the build-up of the brake pressure, since during the filling a comparatively large amount of fluid with low pressure must be conveyed while a small amount of fluid at high pressure is required during braking. Therefore, it is desirable that the brake control valve be configured as a two-stage unit for emergency braking operation. Such a two-stage brake control valve is described in U.S. Pat. No. 4,963,692, issued Oct. 16, 1990 and assigned to the assignee of this application.

SUMMARY OF THE INVENTION

Accordingly, an object of this invention is to provide a two-stage brake control valve which permits emergency brake operation.

Another object of this invention is to provide a brake valve which includes pressure limiting and overload protection during normal operation and when the main pump or pressure source is inoperable.

Another object of this invention is to provide a brake valve which has a simple configuration and which can be manufactured at low cost.

Another object of this invention is to provide a brake valve in which a pressure reducing valve and/or the relief valve are integrated into the piston.

This and other objects are achieved by the present invention wherein a brake valve permits braking with brake filling support with unlimited operating capability. When the brake pedal is actuated, the piston is moved and after overcoming a pre-travel path, opens the port control edge to the pressure source. Thereby, a brake pressure is built up in the brake pressure chamber, which is connected to the brake cylinders. Simultaneously, this brake pressure applies an opposing force on the piston that opposes the actuating force. If the actuating force is maintained, the piston is in a floating position in which the port control edge is in its boundary condition to its closed position. When the actuating force is increased the port control edge is opened and the pressure in the pressure chamber is increased further, corresponding to the actuating force. During this pressure-supported braking the piston moves through the annular piston which remains at rest. The pressure reducing valve remains closed since in the fill-pressure chamber no pressure builds up, in any case no pressure that exceeds the pressure in the brake pressure chamber.

If the pressure source fails, manual braking is performed without pump support. In this method of operation the brake control valve permits a two-stage braking process that assures that an adequate amount of brake fluid is available to fill the brake cylinders and that during the actual braking process a sufficiently high brake pressure can be applied. When the brake pedal is actuated a pre-set stroke of the piston is initially overcome, without the annular piston being carried along by the piston. After this stroke is overcome the piston engages the annular piston so that the latter joins in the movement of the piston. When the piston is moved further along with the annular piston a greater pressure is initially built up in the fill pressure chamber than in the brake pressure chamber, in proportion to the effective cross section, so that the pressure reducing valve opens and the entire cross sectional surface of both piston and annular piston conveys brake fluid to the brake cylinders (fill phase). When a pre-set brake pressure is exceeded, which corresponds to the point of application of the brake pistons of the wheel brakes, the pressure in the fill pressure chamber is released and the pressure reducing valve closes. The pressure release can preferably be performed by a pressure control valve arranged between the fill pressure chamber and the reservoir. If the actuating force is further increased, the pressure build-up in the brake pressure chamber utilizes only the comparatively small cross section of the piston (pressure phase). Thereby, an increase in the actuating force during the pressure phase results in a comparatively more rapid increase in the brake pressure than from an equal increase in the actuating force during the fill phase.

Preferably, the cross section of the pressure control valve arranged between the fill pressure chamber and the reservoir is limited by an orifice arrangement, so that fluid flow out of the fill pressure chamber can be purposefully controlled. This pressure control valve can be a pre-assembled unit capable of operating independently, which can be manufactured and tested separately, and which can be easily inserted into the valve housing, for example, by bolting.

To achieve controlled and modulated braking, the piston is preferably a two-piece assembly which includes an actuating piston and a valve slide, whose ends face each other and between which a modulating spring is arranged. The modulating spring is in a protected location within the cylinder bore. It operates completely within the brake fluid so that during braking any friction-induced hysteresis can be avoided.

The braking characteristic can be varied by the dimension of the effective cross sections or the diameters of the actuating piston and the valve slide. Preferably, the effective cross sections or diameters are equal. Most appropriately, the valve slide is configured as a piston lapped into place in the cylinder bore and contains control ports which are communicated to the brake pressure chamber. The ports interact with annular channels provided in the cylinder bore (pressure annular channel, sump annular channel, equalizing annular channel, load signaling annular channel).

The piston or the valve slide is urged by a spring towards its rest position against the direction of the actuating force. Preferably, the piston or the valve slide contains a recess on its end facing the brake pressure chamber which engages one end of a helical compression spring, the other end of which is supported on the valve housing. This makes possible the use of a relatively long compression spring with a favorable spring characteristic. Also, it is preferable to have a helical modulating spring whose one end engages a recess in the end face of the actuating piston and/or whose other end engages a recess in the end face of the valve slide.

The stroke of the actuating piston between its rest position and the location from which the annular piston is carried along, is preferably dimensioned in such a way that it is equal to the pre-travel path for the port control edge of the pressure connection, that is the distance between the rest position of the port control edge and its position in which a connection is opened between pressure source and brake pressure chamber with the addition of the distance of the end faces of the actuating piston in its rest position and the valve slide and subtracting a safety margin dependent upon tolerances. This assures that the modulating spring is effective at all times during a normal braking. Only under sudden very heavy actuating loads can the actuating piston and the valve slide engage each other.

The annular piston of the brake control valve fulfills two tasks. For one it makes possible a two-stage pressure build-up for the case of failure of the brake system pressure (manual braking). Here the opposing force in the brake pressure chamber during braking (which would have been generated by the pressure of the pressure source) is missing. The piston is moved beyond the control ports and, after overcoming a stroke, carries the annular piston along. Thereby, in manual braking a large piston area becomes effective which consists of actuating piston surface and annular piston surface, in order to build up the fill pressure in the fill pressure chamber and to force the brake fluid into the brake cylinders until the brake pistons of the vehicle brakes are brought into contact. As has already been mentioned, upon further increase in the pressure in the fill pressure chamber, this pressure is released through a pressure control valve to the reservoir and the pressure reducing valve is closed, so that only the smaller surface of the valve slide is employed for the pressure build-up.

Because of the high degree of stiffness, it is appropriate to prevent overloading of the brake system, in particular the brake cylinders and the brake lines, in view of the high actuating forces to be expected. Accordingly, the annular piston limits the brake pressure during pressure-supported braking to a certain value. In a normal pump-supported braking process, this operation, together with the steering brake, is particularly important.

Preferably, the brake valve also included a relief valve between the fill pressure chamber and the brake pressure chamber, which opens when the pressure in the brake pressure chamber exceeds the pressure in the fill pressure chamber by a pre-set amount. The relief valve may be set, for example, for a pressure difference of 80 Bar. The excess pressure in the fill pressure chamber can be released over the aforementioned pressure control valve to the reservoir, where an orifice in the pressure control valve can control the rate of the pressure release.

In a dual-circuit brake, as is commonly used in agricultural tractors, both circuits should be supplied with the same pressure during operation over the road. In order to make pressure equalization possible, the piston is provided with at least one port control edge, that opens a connection between the brake pressure chamber and an equalizing channel that is connected to a second brake control valve when the valve slide is moved out of its rest position. If a hydraulic pump controlled with respect to load is used as pressure source, there is a further advantage in providing a port control edge of the piston or of the valve slide, that connects the load signaling connection of the hydraulic pump to the brake pressure chamber when it is moved out of its rest position. The same port control edge can be used for pressure equalization and for the load signaling.

It is also advantageous to use a hydraulic pump as pressure source that supplies the vehicle system pressure and that also can supply, for example, the hydraulic servo steering. In this case no separate pump is required to supply the brake control valve.

DETAILED DESCRIPTION

The brake control valve shown in the figures includes a valve housing 10 with a stepped cylindrical bore 12, which includes a smaller diameter portion 12a and a larger diameter portion 12b and in which a piston assembly moves. The piston is a multi-piece assembly including an actuating piston 14 and a hollow cylindrical valve slide 16, which are connected to each other by a modulating spring 18 that engages the end faces. The actuating piston 14 and the valve slide 16 are approximately the same diameter and are aligned with each other.

The actuating piston 14 is guided in an insert 20 which is screwed into the enlarged section 12b of the cylindrical bore 12 and extends with its end beyond the valve housing 10. Seal rings 22, 24 between the insert 20 and the valve housing 10 on the one hand and between the actuating piston 14 and the insert 20 on the other hand hermetically seal the cylindrical bore 12. By means of a brake pedal (not shown) an actuating force or pedal force, F, can be applied to the end of the actuating piston 14 that extends beyond the valve housing 10, in order to move the actuating piston 14 into the valve housing 10 and to initiate the braking of the vehicle.

An insert 26 is screwed into and sealed to the valve housing 10 and supports a compression spring 28. Spring 28 urges the valve slide 16, the modulating spring 18 and the actuating piston 14 to the right, viewing FIG. 1. The spring 28 may be designed, for example, for a load of 100 Newton, which corresponds to a piston diameter of 20 mm. to a load of approximately 3 Bar. A considerable portion of the spring 28 is received by longitudinal bore 30 of the valve slide 16 and its end engages a radially inwardly projecting annular shoulder 31.

Figure 1:
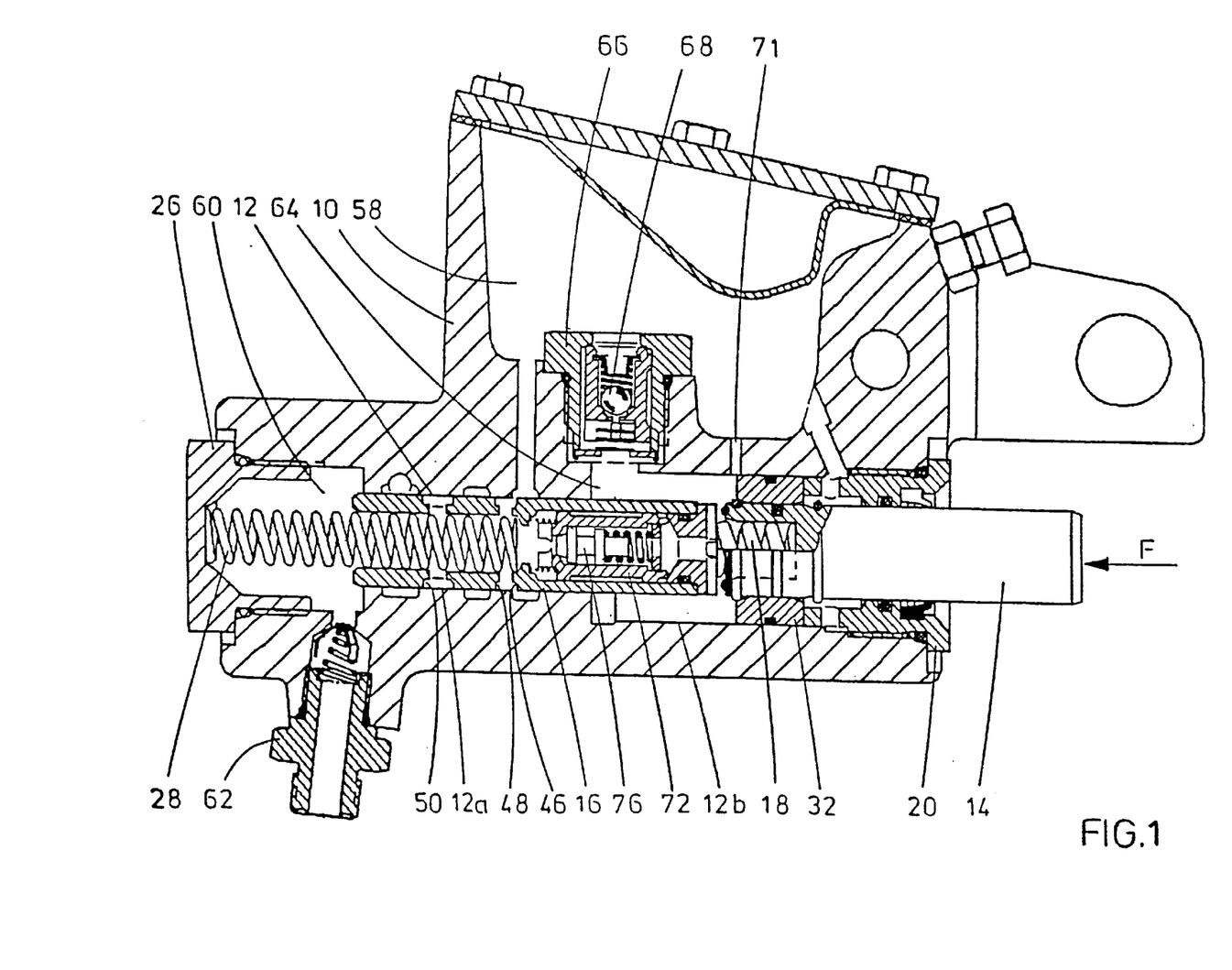
FIG. 1 is a sectional view of a brake control valve according to the invention in its basic position.

The piston assembly also includes an annular piston 32 which slides within the large bore portion 12b and includes an inner bore which receives the end of the actuating piston 14 which projects into the bore 12. The piston 32 is sealed with respect to the bore 12 and the piston 14 by seal rings 34, 36 respectively. The piston 32 can be moved through a limited distance H, with respect to the piston 14. To limit the stroke the piston 14 is provided with a first retaining ring 38 and a second retaining ring 40. As shown in FIG. 1, the piston 32 engages the first retaining ring 38 and engages an end face of the insert 20 and thereby prevents the piston 14 from being forced by the force of the spring 28 beyond the basic position out of the valve housing 10.

The end face of the piston 14 which projects into the cylindrical bore 12A includes blind bore 42 which almost completely encloses the helical modulating spring 18. A smaller portion of spring 18 projects out of the blind bore 42 and engages the opposing end face of the valve slide 16. In the position shown in FIG. 1 the ends of piston 14 and the valve slide 16 are spaced apart by a distance, S.

The valve slide 16 is slidably received in the smaller bore portion 12a. The outer contour is provided with two annular grooves which form port control edges 46, 48, 50 and which are communicated with bore 30 by several radially extending bores distributed therethrough. Three annular grooves are formed in the wall of bore portion 12a, each forming a corresponding set of port control edges. These grooves include an equalizing and load signaling groove 52, a pressure groove 54 and a pressure release groove 56. When the valve slide 16 is moved out of the FIG. 1 position, port control edge 46 closes communication between groove 56 and bore 30 after overcoming a pre-travel path, L. Then the port control edge 50 opens a connection between the groove 52 and bore 30 and thereafter the control edge 48 opens a connection between groove 54 and bore 30.

Groove 56 is connected directly to a reservoir 58 in the housing 10. Groove 54 is connected to a pump P which supplies pressure to the vehicle system. Between the pump and groove 54 a valve arrangement (not shown) may be arranged so as to control the fluid flow which prevents an outflow of fluid from the pressure supplied by the pump out of the bore 12 over the groove 54. Groove 52 is connected to a load signaling passage (not shown) of the pump and to a similar annular groove of a second brake control valve (not shown) of a dual-circuit brake system. These connections may also be provided with control valves which are not described further.

Bore 12 and bore 30 open brake pressure chamber 60 near the end of valve slide 16 which faces away from piston 14. The chamber 60 is connected via a valve insert 62 and brake lines (not shown) with the brake cylinders of the vehicle brake.

A fill pressure chamber 64 is located axially ahead of the piston 32 and is connected via a pressure control valve 66 with the reservoir 58. The pressure control valve 66 includes a ball 68, which is held by a spring 69 closed against a valve seat, as long as the fluid pressure acting on the ball 68 does not exceed the force of the spring 69. An orifice 70 is located ahead of the pressure control valve 66 and limits the fluid flow when the pressure control valve 66 is open. The pressure control valve 66 and the orifice 70 are formed as a unit which can be pre-assembled and bolted into the housing 10. The pressure control valve 66 opens chamber 64 to the reservoir 58 at a pressure, for example, of 5 Bar.

Furthermore, chamber 64 is connected with the reservoir 58 via channel 71 which opens into the bore 12 at a position only slightly ahead of the piston 32 in its normal position. When the piston 32 is moved from its normal position the channel 71 is closed.

A valve insert is received in the portion of bore 30 which is oriented towards the piston 14. The valve insert includes a pressure reducing valve with a sleeve-shaped body 72 and a helical spring 74, a relief valve with a body 76 and a spring 78 and a closure 80.

The closure 80 is inserted into the end of the valve slide 16 which faces towards the piston 14 and is provided with an interior sealing surface 82. The closure 80 is sealed with respect to the valve slide 16 by a seal ring 84. A separate fastener for the closure 80 in the valve slide 16 is not required. The closure 80 contains an axial bore 86 and is provided with radial slots 88 on outwardly facing end face. These radial slots 88 improve the penetration of the fluid flow when the modulating spring 18 is compressed and the distance between the closure 80 and piston 14 is small.

The pressure reducing valve body 72 has an external shoulder at each end with longitudinal penetrations extending therethrough. In order to form the penetrations, the shoulders may be configured with a generally square cross section. The valve body 72 is supported by these shoulders which slide in the bore 30 and is movable between the sealing surface 82 of the closure 80 and a shoulder 31 which projects inwardly from the valve slide 16. Spring 74 is positioned between the body 72 and the shoulder 31 and urges the body 72 against the surface 82 to form a valve seat. The spring 74 is designed so that the pressure reducing valve opens when the pressure difference between the chamber 64 and the chamber 60 is, for example, 0.5 Bar when the body 72 is moved away from the sealing surface 82. Fluid can now flow through the open valve seat, the penetrations of the shoulders and the annular space between the wall of bore 30 and the pressure reducing valve body 72.

The bore which extends through the pressure reducing valve body 72 can be closed by a relief valve includes a relief valve body 76 which is slidable axially therewithin. The valve body 76 has a cone-shaped end which faces chamber 60 and which forms a valve seat together with a cone-shaped inner surface of the body 76. The spring 78 urges the valve body 76 towards this valve seat. The spring 78 is supported on a washer 90 which is fastened by a retaining ring 92 to the valve body 72. The spring 78 is designed so that body 76 lifts off the valve seat to open the relief valve at a pressure difference of, for example, 80 Bar between the brake pressure chamber 60 and the fill pressure chamber 64. When the relief valve is open, fluid flows from chamber 60 through bore 30 into the penetration channel of the pressure reducing valve body 72, past the relief valve body 76, through the washer 90 and through hollow center and the radial slots 88 of the closure 80 into the fill pressure chamber 64.

Mode of Operation

Figure 2:
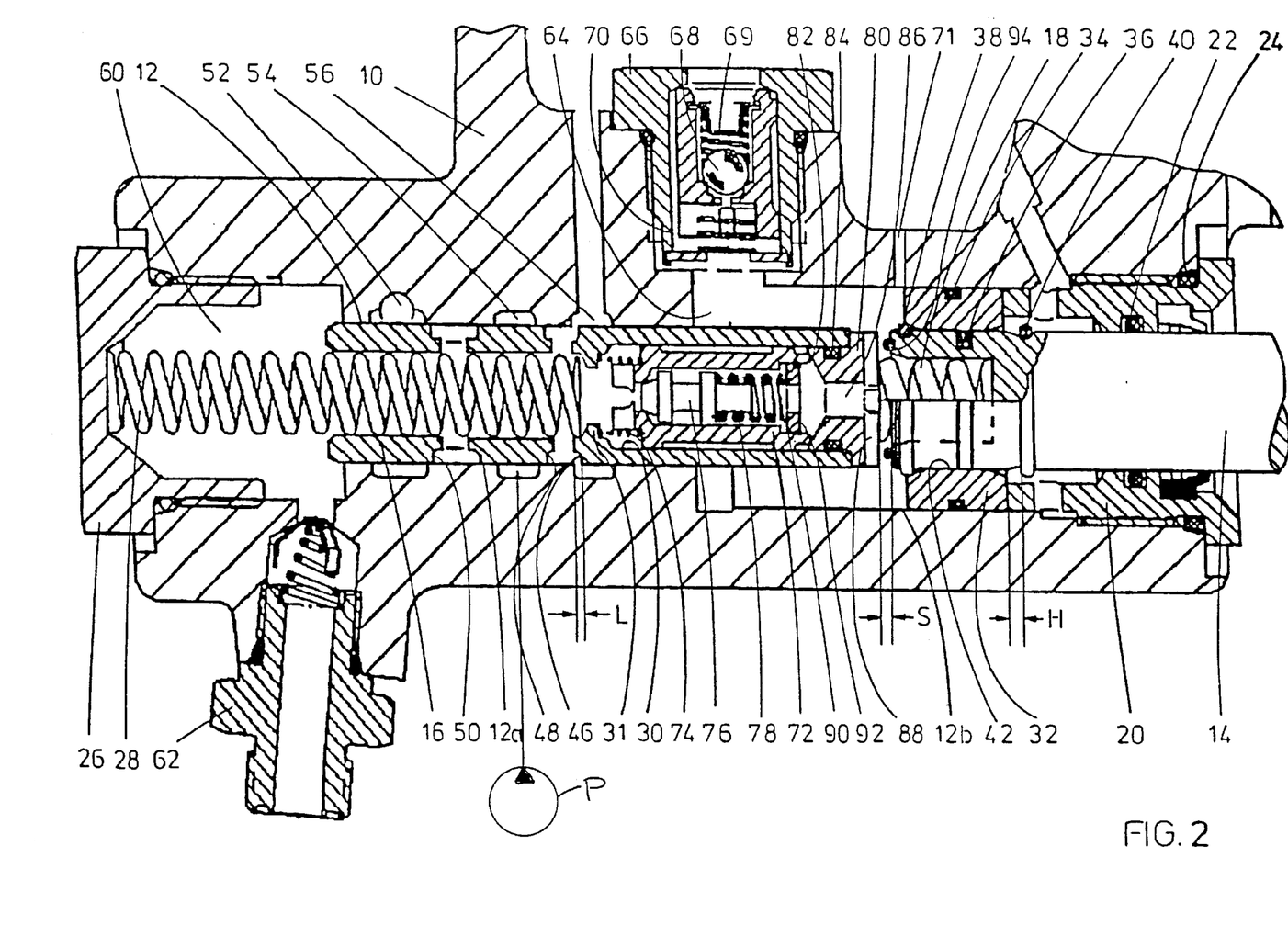
FIG. 2 is an enlarged view of a portion of FIG. 1.

In the position shown in FIGS. 1 and 2, the piston 14 is located in its right end position and the vehicle brakes are not actuated. The compression spring 28 forces the valve slide 16 together with the modulating spring 18 and the piston 14 to the right, so that the piston 14 engages the first retaining ring 38 and the piston 32 engages the end face of the insert 20. Fluid communication is open through channel 71 between the fill pressure chamber 64 and the reservoir 58, and the pressure control valve 66 is closed. The spring 18 is considerably stronger than the spring 28 and holds the valve slide 16 spaced apart from piston 14 by distance S. The position of port control edge 46 permits a fluid flow between chamber 60 and reservoir 58. The outer surface of the valve slide 16 closes grooves 54 and 52, so that communication with brake pressure chamber 60 is closed, and chambers 64 and 60 are exposed to reservoir pressure. Therefore, the pressure reducing valve 72 and the relief valve 76 are closed.

Figure 3:
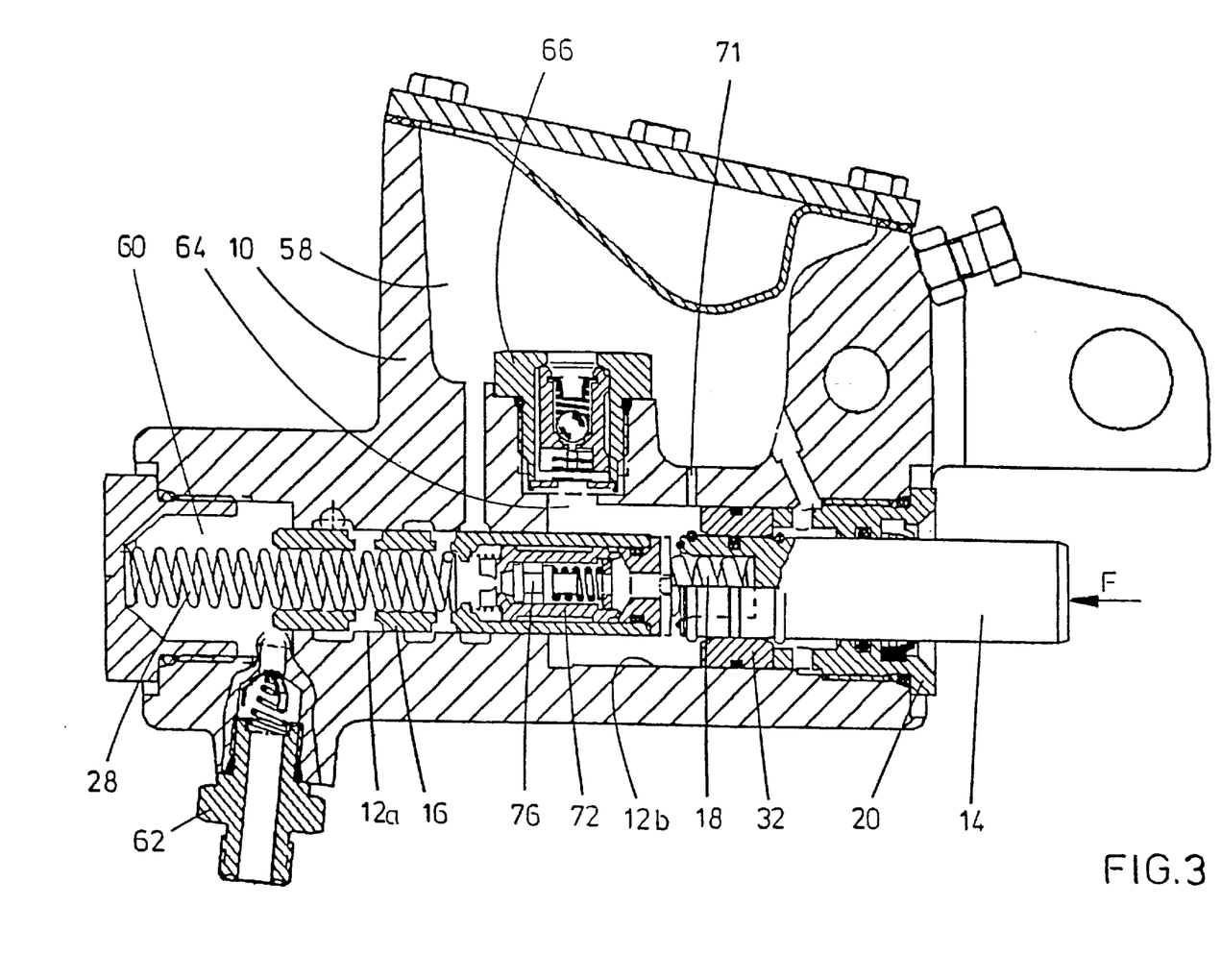
FIGS. 3, 4 and 5 show the brake control valve of FIG. 1 in various positions.

When the pump P is operating, actuation of the brake pedal (not shown) applies a force, F, to the piston 14, which moves it to the left together with the valve slide 16 against the force of the compression spring 28, without moving piston 32. As the actuating force increases, the piston 14 and the valve slide 16 moves over a pre-travel path, L, and control edge 46 closes communication between chamber 60 and reservoir 58. The control edge 48 also connects groove 54 with chamber 60, as is shown in FIG. 3. (Simultaneously or somewhat earlier control edge 50 opens communication between groove 52 and chamber 60.) Thereby, pressurized fluid from the pump reaches the brake pressure chamber 60 and applies a pressure force to the left end face of the valve slide 16 and via spring 18 to the piston 14 in opposition to the actuating force, F. The valve slide 16 is maintained in equilibrium between the pressure force in the brake pressure chamber 60 and the force of the compression spring 28 on the one hand, and the actuating force, F, on the other hand. Thereby it "floats" about a position in which communication between groove 54 and chamber 60 is open and closed.

As the force F increases, the pressure in chamber 60 increases. Thereby, the valve slide 16 will be held generally in its floating position, while the piston 14 is moved further to the left by the modulating spring 18. The compression stroke thereby developed is proportional to the pressure in the brake pressure chamber 60.

Figure 4:
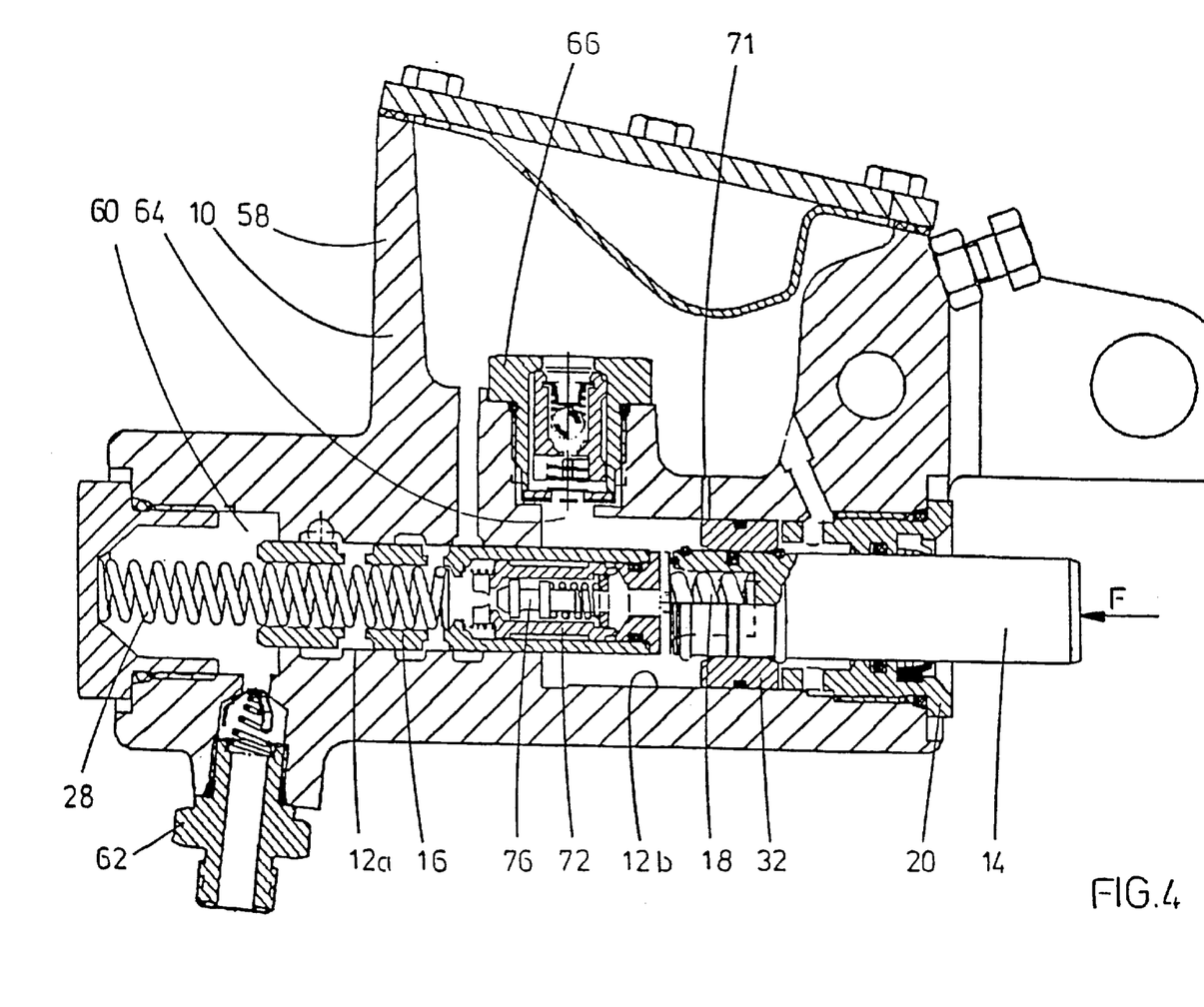

If the piston 14 is moved so far that the sum of the pre-travel path, L, and compression stroke reaches a value that is greater than the distance between the piston 32 and the second retaining ring 40, which corresponds to the limited stroke, H, of piston 32, then piston 32 moves together with piston 14 to the left. This condition is reached at a brake pressure of 50 Bar and is shown in FIG. 4. The movement of piston 32 closes the channel 71 between the chamber 64 and reservoir 58, so that pressure in chamber 64 increases up to the opening pressure of pressure control valve 66. The force, F, required to increase the brake pressure increases more rapidly at the beginning of the movement of piston 32, since, in addition to the brake pressure force applied to the valve slide 16, a force must be generated that corresponds to the opening pressure of the pressure control valve 66 as applied to the piston 32.

As piston 32 becomes operative, the amount of force required to move it increases rapidly, and this transition can be sensed by the operator. In order to make this transition more gradual, an O-ring 94 is applied to a recess in the end face of the piston 14 so that the O-ring projects approximately 0.4 mm. above the surface of the end face of the piston 14. Shortly before piston 32 becomes operative, the O-ring 94 makes contact with the opposing end face of the valve slide 16 and acts as a supplementary damping spring operating in parallel with the modulating spring 18.

As the force F increases further, the brake pressure also increases further and opens the relief valve 76 at, for example, a pressure of 80 Bar. The fluid flowing through the relief valve 76 into chamber 64 cannot flow freely through the pressure control valve 66 into the reservoir 58, but is retarded by the orifice 70 that is located ahead of the pressure control valve 66. Therefore, the pressure in the fill pressure chamber 64 increases and applies an additional load to piston 32. This prevents a significant increase in the brake pressure and prevents overloading of the brake lines and the vehicle brakes. The pressure in the fill pressure chamber 64 and thereby the pressure limiting effect can be adjusted by calibrating the orifice 70.

The brake valve thus exhibits a decreasing brake characteristic. Initially, only the relatively small area of the valve slide 16 builds up the brake pressure upon braking. However, if the piston 14 is moved by increasing the force F and by compression of the modulating spring 18 to such a degree that it carries along the annular piston 32, then an additional force must be applied that corresponds to the opening pressure of the pressure control valve 66 and the cross sectional area of the piston 32. When a maximum brake pressure of, for example, 80 Bar is reached, the relief valve 76 opens and loads the piston 32 and therewith also the actuating piston 14 considerably. It is then difficult to overcome this load by further increasing the force F in order to further increase the brake pressure.

If the pressure source or pump P is inoperative, then the braking process is not supported by the fill volume. Because there is no pressure in the pressure channel 54, the valve slide 16, together with the actuating piston 14, is moved to the left out of its floating position in response to increasing the force F, beyond the pre-travel distance L. After piston 14 moves through distance H, the retaining ring 40 engages the piston 32 so that piston 32 is carried along and increases pressure in the fill pressure chamber 64. When the pressure in chamber 64 exceeds the pressure in the brake pressure chamber 60, the pressure reducing valve 72 opens so that the sum of the cross sectional areas of the valve slide 16 and the piston 32 are employed for the filling of the vehicle brakes up to the point of contact of the brake cylinders, so that a large fill volume is supplied with a relatively small piston stroke.

Figure 5:
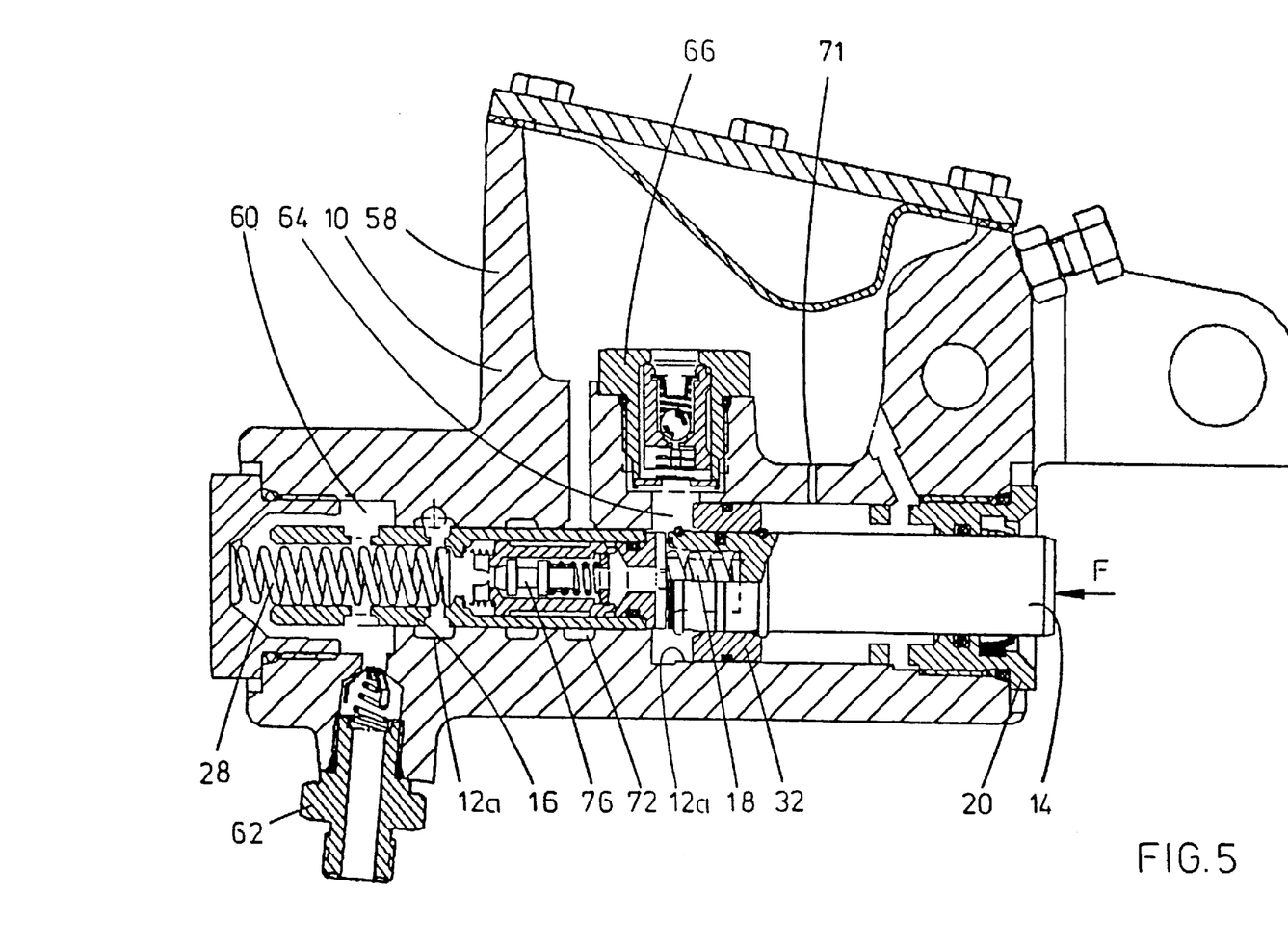

When the opening pressure of the pressure control valve 66 is reached, the pressure in the fill pressure chamber 64 is released to the reservoir 58, the pressure in the fill pressure chamber 64 does not increase any further, and the pressure reducing valve 72 is now closed by the further increasing pressure in the brake pressure chamber 60, as is shown in FIG. 5. The pressure increase in the brake pressure chamber 60 is now generated only by the cross section of the valve slide 16, so that by increasing the force F, relatively large brake pressure increases can be produced.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A brake control valve having a piston assembly which is movable against a spring in response to an actuating force F in a stepped cylindrical bore of a valve housing, the housing and the piston assembly defining a fill pressure chamber and a brake pressure chamber for connecting to vehicle brakes, the piston assembly having port control edges which control communication between a pressure source, a reservoir and the brake pressure chamber, so that both the pressure source and the piston assembly contribute to the pressure in the brake pressure chamber, the piston assembly including a smaller diameter piston and a larger diameter annular piston, the larger diameter piston being slidable in a larger diameter portion of the stepped bore and being slidably coupled to the smaller diameter piston so that movement of the smaller diameter piston causes the larger diameter piston to move only after the smaller diameter piston has moved through a pre-set distance H, the improvement wherein:

the larger piston remains sealingly coupled to the smaller piston, the housing and the larger and smaller pistons enclosing the fill pressure chamber, the fill pressure chamber being spaced apart from the brake pressure chamber; and a pressure reducing valve connects the fill pressure chamber with the brake pressure chamber the pressure reducing valve opening to permit fluid flow from the fill pressure chamber to the brake pressure chamber, and when a pre-set brake pressure in the brake pressure chamber is exceeded, the pressure in the fill pressure chamber is released by the pressure reducing valve, and the pressure reducing valve is closed.

2. The brake control valve of claim 1, wherein:

a pressure control valve communicates the fill pressure chamber with the reservoir.

3. The brake control valve of claim 2, wherein:

the pressure control valve includes orifice means for limiting fluid flow therethrough.

4. The brake control valve of claim 3, wherein:

the pressure control valve and the orifice arrangement comprise a pre-assembled unit which can be inserted into the valve housing.

5. The brake control valve of claim 1, wherein:

the piston assembly comprises an actuating piston and a valve slide, and a modulating spring is located between end faces thereof.

6. The brake control valve of claim 5, wherein:

the actuating piston and the valve slide have approximately equal cross sectional areas.

7. The brake control valve of claim 5, wherein:

a recess is formed in an end face of the valve slide which faces towards the brake pressure chamber, the recess receiving an end of a compression spring, the compression spring having an other end which engages the valve housing.

8. The brake control valve of claim 5, wherein:

the modulating spring is a helical compression spring with a first end received by a blind bore in an end face of the actuating piston and a second end received by a recess in an end face of the valve slide.

9. The brake control valve of claim 5, wherein:

the actuating piston and the valve slide are separated by a distance S when the brake valve is not actuated; and one of the control edges closing communication to the reservoir when the piston assembly moves a pre-travel distance L, the pre-set distance H being substantially equal to a sum of distances S and L.

10. The brake control valve of claim 5, wherein:

an O-ring is mounted in a groove in an end face of the actuating piston which faces the valve slide, the O-ring projecting partially beyond a surface of the end face.

11. The brake control valve of claim 1, wherein:

the fill pressure chamber is communicated with the pressure chamber through a relief valve which opens upon a pre-set pressure difference between the pressure chamber and the fill pressure chamber.

12. The brake control valve of claim 1, wherein:

the piston assembly comprises an actuating piston and a valve slide, the valve slide having a port control edge which controls communication between the pressure chamber and an equalizing channel.

13. The brake control valve of claim 1, wherein:

the pressure source comprises a hydraulic pump which supplies vehicle system pressure.

14. A brake control valve having a piston assembly which is movable against a spring in response to an actuating force F in a stepped cylindrical bore of a valve housing, the housing and the piston assembly defining a fill chamber and a pressure chamber for connecting to vehicle brakes, the piston assembly having port control edges which control communication between a pressure source, a reservoir and the pressure chamber, so that both the pressure source and the piston assembly contribute to the pressure in the pressure chamber, the piston assembly including a smaller diameter piston and a larger diameter annular piston, the larger diameter piston being slidable in a larger diameter portion of the stepped bore and being slidably coupled to the smaller diameter piston so that movement of the smaller diameter piston causes the larger diameter piston to move only after the smaller diameter piston has moved through a pre-set distance H, the improvement wherein:

the larger piston remains sealingly coupled to the smaller piston, the housing and the larger and smaller pistons enclosing the fill pressure chamber, the fill pressure chamber being spaced apart from the pressure chamber; and a pressure reducing valve connects the fill pressure chamber with the pressure chamber, the pressure reducing valve opening to permit fluid flow from the fill pressure chamber to the pressure chamber, and the fill pressure chamber is communicated with the pressure chamber through a relief valve which opens upon a pre-set pressure difference between the pressure chamber and the fill pressure chamber.

15. The brake control valve of claim 14, wherein:

the pressure reducing valve and the relief valve are enclosed within the piston assembly.

16. The brake control valve of claim 14, wherein:

the piston assembly comprises an actuating piston and a valve slide; and the pressure reducing valve and the relief valve are enclosed within the valve slide.

17. The brake control valve of claim 16, wherein:

a bore extends through the valve slide, a wall of the bore forming a conical sealing surface near an end of the valve slide which faces away from the pressure chamber, a pressure reducing valve is slidable in the bore and is urged by a pressure reducing valve spring into engagement with the sealing surface, the pressure reducing valve being moved away from the sealing surface to open communication between the fill pressure chamber and the pressure chamber when the pressure in the fill pressure chamber overcomes the pressure in the pressure chamber and the force of the pressure reducing valve spring.

18. The brake control valve of claim 17, wherein:

the pressure reducing valve having a hollow cylindrical body which forms, on an end oriented towards the pressure chamber, an inner sealing surface; and a relief valve is slidable within the pressure reducing valve and is urged by relief valve spring into engagement with the inner sealing surface, the relief valve being moved away from the inner sealing surface to open communication between the pressure chamber and the fill pressure chamber when the pressure in the pressure chamber overcomes the pressure in the fill pressure chamber and the force of the relief valve spring.

19. A brake control valve having a piston assembly which is movable against a spring in response to an actuating force F in a stepped cylindrical bore of a valve housing, the housing and the piston assembly defining a fill chamber and a pressure chamber for connecting to vehicle brakes, the piston assembly having port control edges which control communication between a pressure source, a reservoir and the pressure chamber, so that both the pressure source and the piston assembly contribute to the pressure in the pressure chamber, the piston assembly including a smaller diameter piston and a larger diameter annular piston, the larger diameter piston being slidable in a larger diameter portion of the stepped bore and being slidably coupled to the smaller diameter piston so that movement of the smaller diameter piston causes the larger diameter piston to move only after the smaller diameter piston has moved through a pre-set distance H, the improvement wherein:

the larger piston remains sealingly coupled to the smaller piston, the housing and the larger and smaller pistons enclosing the fill pressure chamber, the fill pressure chamber being spaced apart from the pressure chamber;

a pressure reducing valve connects the fill pressure chamber with the pressure chamber, the pressure reducing valve opening to permit fluid flow from the fill pressure chamber to the pressure chamber; and a pressure control valve communicates the fill pressure chamber with the reservoir, the pressure control valve including an orifice for limiting fluid flow therethrough, and the pressure control valve and the orifice comprise a pre-assembled unit which can be inserted into the valve housing.

20. A brake control valve having a piston assembly which is movable against a spring in response to an actuating force F in a stepped cylindrical bore of a valve housing, the housing and the piston assembly defining a fill chamber and a pressure chamber for connecting to vehicle brakes, the piston assembly having port control edges which control communication between a pressure source, a reservoir and the pressure chamber, so that both the pressure source and the piston assembly contribute to the pressure in the pressure chamber, the piston assembly including a smaller diameter piston and a larger diameter annular piston, the larger diameter piston being slidable in a larger diameter portion of the stepped bore and being slidably coupled to the smaller diameter piston so that movement of the smaller diameter piston causes the larger diameter piston to move only after the smaller diameter piston has moved through a pre-set distance H, the improvement wherein:

the larger piston remains sealingly coupled to the smaller piston, the housing and the larger and smaller pistons enclosing the fill pressure chamber, the fill pressure chamber being spaced apart from the pressure chamber, the piston assembly comprising an actuating piston and a valve slide, and a modulating spring is located between end faces thereof, the modulating spring being a helical compression spring with a first end received by a blind bore in the end face of the actuating piston and a second end received by a recess in the end face of the valve slide; and a pressure reducing valve connects the fill pressure chamber with the pressure chamber, the pressure reducing valve opening to permit fluid flow from the fill pressure chamber to the pressure chamber.

21. A brake control valve having a piston assembly which is movable against a spring in response to an actuating force F in a stepped cylindrical bore of a valve housing, the housing and the piston assembly defining a fill chamber and a pressure chamber for connecting to vehicle brakes, the piston assembly having port control edges which control communication between a pressure source, a reservoir and the pressure chamber, so that both the pressure source and the piston assembly contribute to the pressure in the pressure chamber, the piston assembly including a smaller diameter piston and a larger diameter annular piston, the larger diameter piston being slidable in a larger diameter portion of the stepped bore and being slidably coupled to the smaller diameter piston so that movement of the smaller diameter piston causes the larger diameter piston to move only after the smaller diameter piston has moved through a pre-set distance H, the improvement wherein:

the larger piston remains sealingly coupled to the smaller piston, the housing and the larger and smaller pistons enclosing the fill pressure chamber, the fill pressure chamber being spaced apart from the pressure chamber;

the piston assembly comprises an actuating piston and a valve slide, and a modulating spring is located between end faces thereof, the actuating piston and the valve slide are separated by a distance S when the brake valve is not actuated, and the piston assembly closing communication to the reservoir when the piston assembly moves a pre-travel distance L, the pre-set distance H being substantially equal to a sum of distances S and L; and a pressure reducing valve connects the fill pressure chamber with the pressure chamber, the pressure reducing valve opening to permit fluid flow from the fill pressure chamber to the pressure chamber.

22. A brake control valve having a piston assembly which is movable against a spring in response to an actuating force F in a stepped cylindrical bore of a valve housing, the housing and the piston assembly defining a fill chamber and a pressure chamber for connecting to vehicle brakes, the piston assembly having port control edges which control communication between a pressure source, a reservoir and the pressure chamber, so that both the pressure source and the piston assembly contribute to the pressure in the pressure chamber, the piston assembly including a smaller diameter piston and a larger diameter annular piston, the larger diameter piston being slidable in a larger diameter portion of the stepped bore and being slidably coupled to the smaller diameter piston so that movement of the smaller diameter piston causes the larger diameter piston to move only after the smaller diameter piston has moved through a pre-set distance H, the improvement wherein:

- the larger piston remains sealingly coupled to the smaller piston, the housing and the larger and smaller pistons enclosing the fill pressure chamber, the fill pressure chamber being spaced apart from the pressure chamber;
- the piston assembly comprises an actuating piston and a valve slide, and a modulating spring is located between end faces thereof;
- an O-ring is mounted in a groove in the end face of the actuating piston which faces the valve slide, the O-ring projecting partially beyond a surface of the end face; and
- a pressure reducing valve connects the fill pressure chamber with the pressure chamber, the pressure reducing valve opening to permit fluid flow from the fill pressure chamber to the pressure chamber.

23. A brake control valve having a piston assembly which is movable against a spring in response to an actuating force F in a stepped cylindrical bore of a valve housing, the housing and the piston assembly defining a fill chamber and a pressure chamber for connecting to vehicle brakes, the piston assembly having port control edges which control communication between a pressure source, a reservoir and the pressure chamber, so that both the pressure source and the piston assembly contribute to the pressure in the pressure chamber, the piston assembly including a smaller diameter piston and a larger diameter annular piston, the larger diameter piston being slidable in a larger diameter portion of the stepped bore and being slidably coupled to the smaller diameter piston so that movement of the smaller diameter piston causes the larger diameter piston to move only after the smaller diameter piston has moved through a pre-set distance H, the improvement wherein:

- the larger piston remains sealingly coupled to the smaller piston, the housing and the larger and smaller pistons enclosing the fill pressure chamber, the fill pressure chamber being spaced apart from the pressure chamber;
- the piston assembly comprises an actuating piston and a valve slide, the valve slide having a port control edge which controls communication between the pressure chamber and an equalizing channel; and
- a pressure reducing valve connects the fill pressure chamber with the pressure chamber, the pressure reducing valve opening to permit fluid flow from the fill pressure chamber to the pressure chamber.

* * * * *